No. 850,763. PATENTED APR. 16, 1907.
J. M. LAMBERT.
AUTOMOBILE SLED.
APPLICATION FILED JULY 15, 1905.
3 SHEETS—SHEET 1.
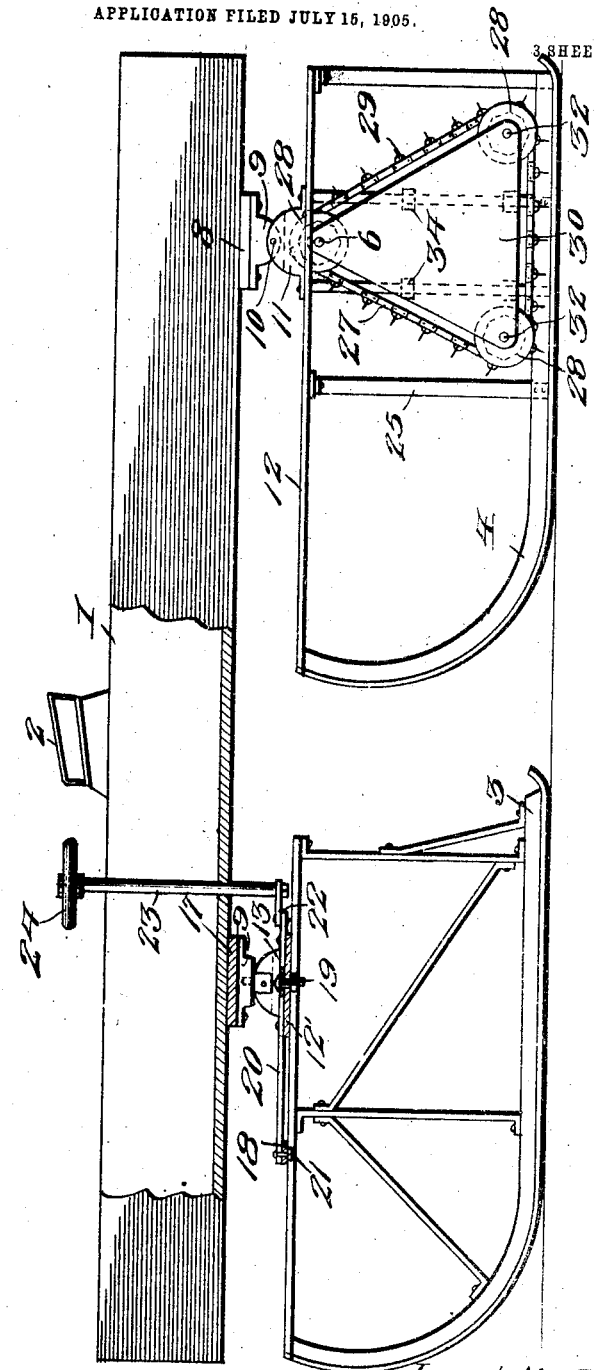
Fig. 6.
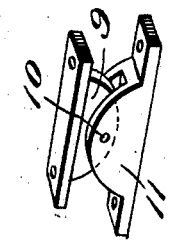
Fig. 7.
Witnesses
Frank B. Hoffman
F. A. Elmore
Inventor
Joseph M. Lambert
By Victor J. Evans
Attorney No. 850,763. PATENTED APR. 16, 1907.
J. M. LAMBERT.
AUTOMOBILE SLED.
APPLICATION FILED JULY 15, 1905.
3 SHEETS—SHEET 2.
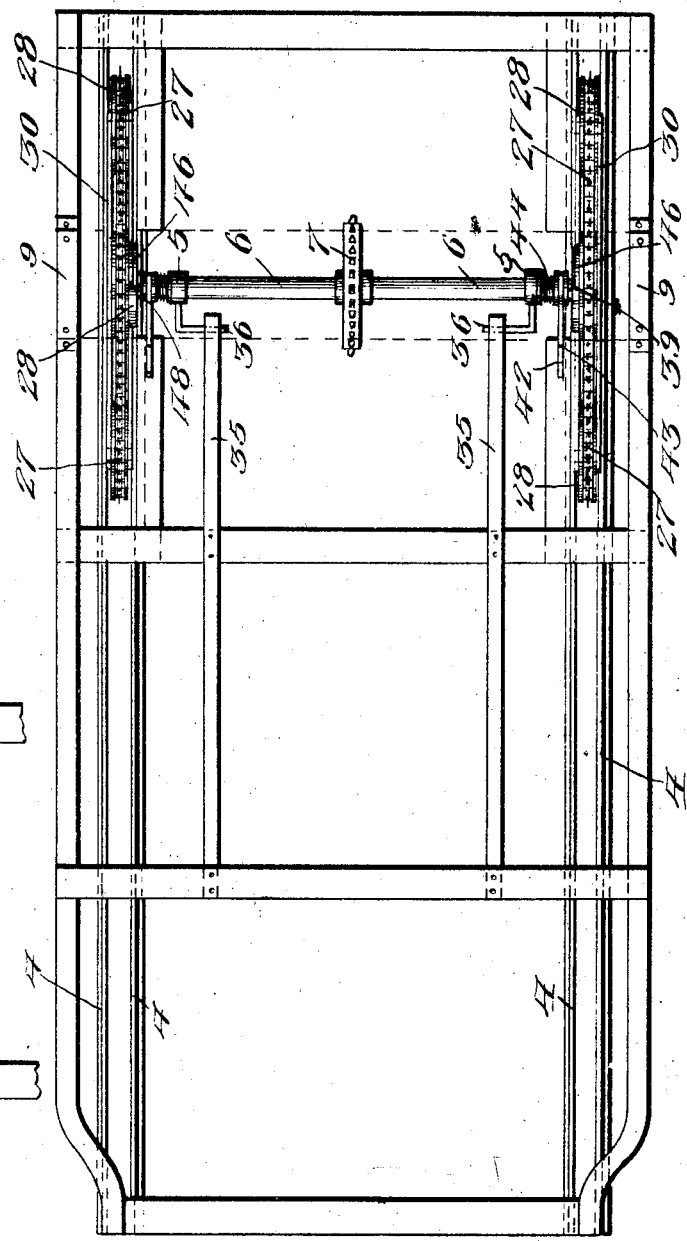
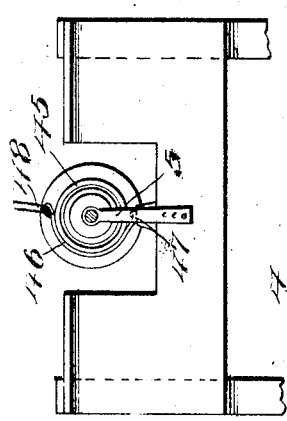
Witnesses
Frank B. Hoffman
P. S. Elmore
Inventor
Joseph M. Lambert
By Victor J. Evans
Attorney No. 850,763. PATENTED APR. 16, 1907.
J. M. LAMBERT.
AUTOMOBILE SLED.
APPLICATION FILED JULY 15, 1905.

3 SHEETS—SHEET 3.

Witnesses
Frank B. Hoffman
A. S. Elmore

Inventor
Joseph M. Lambert
By Victor J. Evans
Attorney

UNITED STATES PATENT OFFICE.

JOSEPH M. LAMBERT, OF MONTAGUE, MASSACHUSETTS.

AUTOMOBILE SLED.

No. 850,763.   Specification of Letters Patent.   Patented April 16, 1907.

Application filed July 15, 1905. Serial No. 269,795.

*To all whom it may concern:*

Be it known that I, JOSEPH M. LAMBERT, a citizen of the United States of America, residing at Montague, in the county of Franklin and State of Massachusetts have invented new and useful Improvements in Automobile Sleds, of which the following is a specification.

This invention relates to motor-vehicles adapted to travel on runners, and has for its objects to produce a comparatively simple inexpensive device of this character having an efficient mechanism for positively driving the vehicle, one wherein the engaging portions of the propelling member will be maintained at all times in proper engagement with the surface over which the vehicle travels, and one in which the runner and propelling members will have free movement to conform readily to surface irregularities.

A further object of the invention is to provide a device of this class in which the propelling members will be maintained yieldably in contact with the surface, one in which the propellers may be disengaged from and adapted to travel idly upon the drive-shaft in rounding curves, and one wherein the vehicle may be readily and positively steered.

With these and other objects in view the invention comprises the features of construction and combination of parts more fully hereinafter described.

Figure 3:
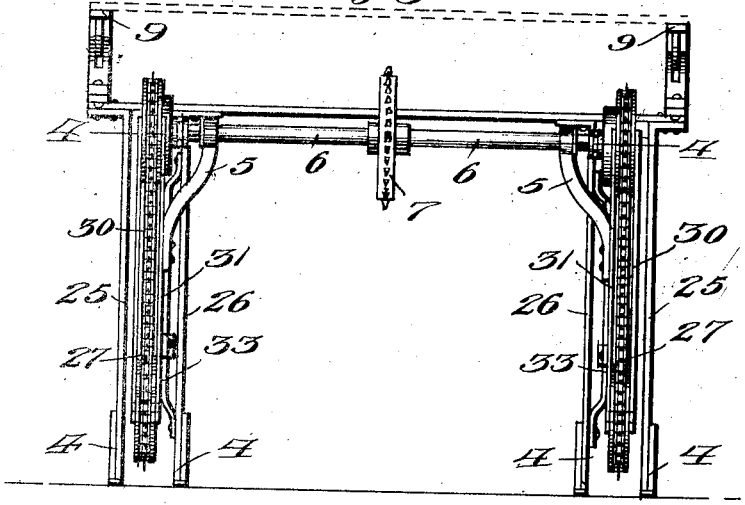
Figure 4:
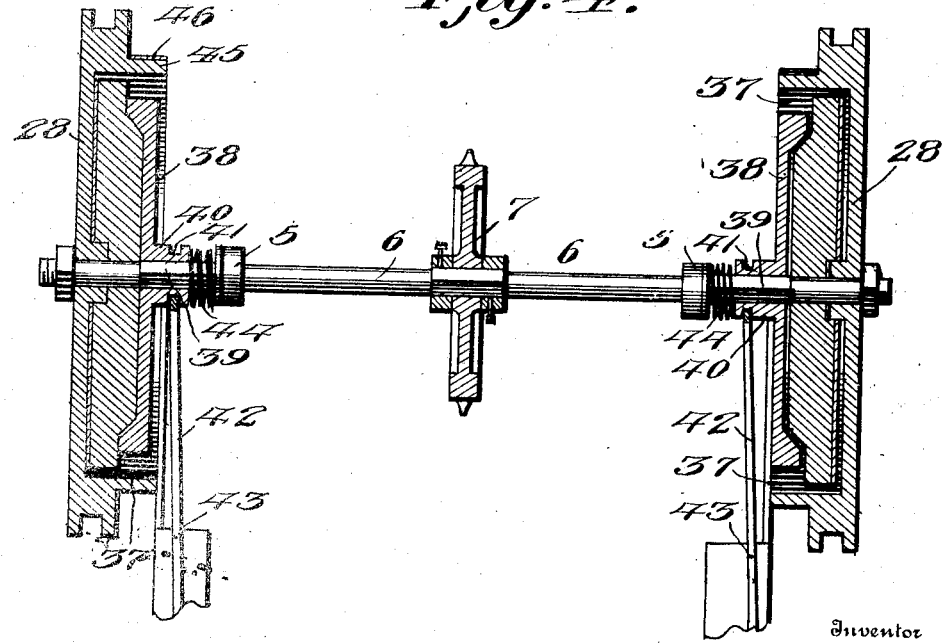

In the accompanying drawings, Figure 1 is a side elevation, partly in section, of a vehicle embodying the invention. Fig. 2 is a top plan view of the running-gear with the body removed. Fig. 3 is a rear elevation of the same. Fig. 4 is a detail horizontal section taken on the line 4 4 of Fig. 3. Fig. 5 is a detail view of the band-brake. Fig. 6 is a perspective view of one of the front hangers. Fig. 7 is a similar view of one of the rear hangers.

Referring to the drawings, 1 designates the body of the vehicle, provided with a seat 2 and mounted for travel upon front runners 3 and rear runners 4, pivoted to the body in a manner hereinafter explained to swing in a vertical plane, there being journaled beneath the rear end of the body in bearings 5 a rotary drive-shaft 6, having fixed thereon a drive wheel or gear 7, adapted to be connected, through the medium of a drive-chain, with a suitable motor. (Not shown.)

Fixed beneath the rear end of the body 1 is a transversely-extending board 8, to which is attached semicircular bearings or coupling members 9, centrally pivoted, as at 10, between the spaced side portions of semicircular bearing members or couplings 11, fixed upon the top bars 12 of the runners 4, thus adapting the latter to rock upon the horizontal pintles 10 in a vertical plane to conform to surface irregularities, while the front runners 3 are connected by a transversely-extending board 12', pivoted at its ends to the runners and having fixed thereto semicircular bearings 13, pivoted on horizontal pintles or axles 14 in the forked heads 15 of bearings having vertical stems 16, pivotally engaged with a transverse board 17, fixed beneath the vehicle-body 1. The runners 3 are connected near their forward ends by a transverse bar or element 18, pivoted at its ends to the runners, there being pivoted, as at 19, to the board 12' a lever 20, pivotally connected, as at 21, to the bar 18 and having its rear end pivotally engaged with a crank-arm 22, fixed upon the lower end of a steering-shaft 23, equipped with a hand-wheel 24, disposed within reach from the driver's seat 2. It is obvious that when the shaft 23 is rotated in either direction the crank-arm 22 will act through the medium of lever 20 and crossbar 18 to swing the runners 3 horizontally upon the pivots 16 for steering or guiding the vehicles and that the runners will move in unison, due to connection by the bar 18.

The rear runners 4 each comprise a pair of spaced sections or frames 25 26, between which is disposed one of a pair of propelling members or devices 27 in the form of a chain belt, arranged for travel upon a plurality of wheels or pulleys 28 and having outwardly-projecting surface-engaging spikes or teeth 29. The pulleys 28, which are disposed relatively in triangular form, are seated between a pair of spaced substantially triangular side plates 30 31, the pair of lower pulleys 28 being journaled upon horizontal pintles or axles 32, while the upper pulleys 28 of the propelling members are fixed upon the ends of and to be driven with the shaft 6, the bearings 5 of which latter are in the form of bracket-arms, attached to the inner plates 31. It will be observed that under this construction and during rotation of the shaft 6 the propelling members or chains 27 will be positively driven and will, owing to engagement of the spurs or teeth 29 with the surface over which the vehicle travels, positively propel the vehicle.

Fixed to each of the inner runner-frames 26 is a pair of vertical guide members or bars 33, on which are slidably-disposed connecting members or clips 34, attached to the adjacent inner plate 31, whereby the propelling devices 27 are adapted as a whole, together with the shaft 6, for vertical movement to maintain the engaging spurs 29 yieldably in contact with the surface, this movement of the parts being controlled by springs 35, the ends of which are engaged by crank-arms 36 fixed upon the drive-shaft bearings 5. It is apparent that under this construction as the vehicle travels over the ground the runners 4 will have a swinging movement, as before stated, for conforming to surface irregularities and that the springs 35 will serve to maintain the propelling members yieldably in contact with the surface, thus adapting them to conform to the movement of the runners.

The upper pulleys 28, carried by the shaft 6, are each provided at its inner face with a chamber 37, designed to receive a clutch head or disk 38, slidably disposed upon a squared portion 39 of the shaft and having a hub 40 provided with a peripheral groove 41, which receives the forked end of a lever 42, pivoted at 43 to the vehicle-frame and adapted for moving the clutch-head against the action of a spring 44, by means of which it is normally pressed to clutching position. The springs 44 serve, as will be understood, for pressing the clutch members 38 into frictional contact with pulleys 28, thus fixing the latter for rotation with shaft 6, it being apparent that by moving either of the levers 42 the corresponding clutch 38 may be moved to non-engaging position, thereby releasing the corresponding pulley 28 and adapting it to travel idly upon the shaft, whereby either of the propelling devices 27 may be thrown out of action in rounding curves.

The upper or driven pulleys 28 are each provided on its inner face with a horizontally-projecting braking portion or flange 45, adapted for engagement by a strap or band brake 46, having one end fixed, as at 47, to the adjacent bearing-arm 5 and its other end attached to an operating-lever 48, it being apparent that by properly manipulating the lever the brake may be brought into frictional engagement with the flange 45 for checking rotation of the shaft 6 to control the speed of or entirely stop the vehicle.

In practice, supposing the parts to be in normal position and the shaft 6 to be driven by the motor, the propelling members 27 will be operated through the medium of the upper or driven pulleys 28 for positively propelling the vehicle, which may be steered through the medium of the shaft 23 and its connected steering mechanism, as heretofore explained. To check the speed of the vehicle, the brakes 46 are brought into firm engagement with the braking-surfaces 45, while either of the propelling devices may be thrown out of action through the medium of levers 42 and clutch member 38 to adapt the vehicle for rounding curves, as before explained.

From the foregoing it is apparent that I produce a comparatively simple inexpensive device of the character described admirably adapted for the attainment of the ends in view, it being understood that minor changes in the details herein set forth may be resorted to without departing from the spirit of the invention.

Having thus described my invention, what I claim is—

In a device of the class described, a vehicle provided with a runner comprising a pair of spaced side members, a plurality of pulleys journaled between the side members of the runner, a propelling-chain arranged for travel on said pulleys and having surface-engaging portions, a drive-shaft sustained beneath the vehicle and having one of the chain-carrying pulleys idly mounted thereon, and means for clutching said pulley to or releasing it from the shaft at will for operating the propelling-chain.

In testimony whereof I affix my signature in presence of two witnesses.

JOSEPH M. LAMBERT.

Witnesses:
 FRANK A. FOSTER,
 IOWA GINGRAS.